Figure 3:
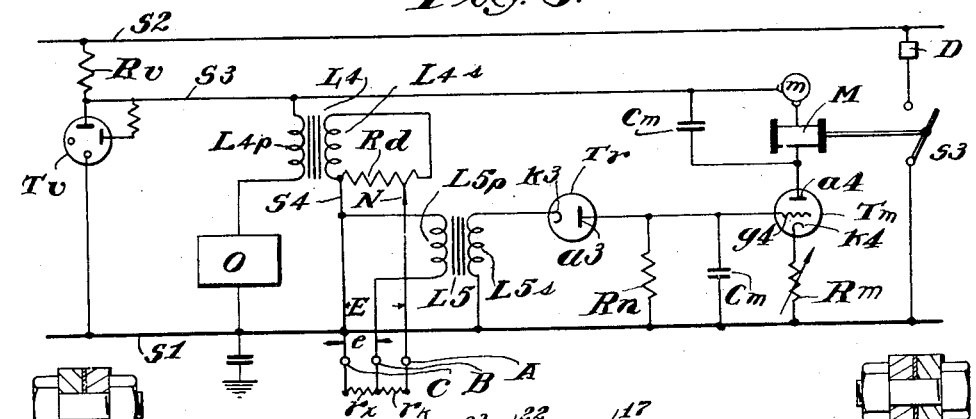

Oct. 5, 1948.　　　E. C. THOMSON　　　2,450,459
ELECTRODE SYSTEM
Filed Jan. 13, 1944

Inventor
E. Craig Thomson
by [signature]
Attorney

Patented Oct. 5, 1948

2,450,459

UNITED STATES PATENT OFFICE 2,450,459

ELECTRODE SYSTEM

Elihu Craig Thomson, Boston, Mass., assignor to Photoswitch, Incorporated, Cambridge, Mass., a corporation of Massachusetts Application January 13, 1944, Serial No. 518,128

3 Claims. (Cl. 175—183)

This invention relates to electrode systems for measuring electrical characteristics such as conductivity or dielectric constant of materials, and especially to devices which incorporate a standard on which the measurement can be based, in addition to the measured sample itself.

It is often desirable to measure an electrical property of a given substance under controlled conditions, quickly and yet exactly, or to compare an electric property of a given medium to the same property of a standard medium. For example, in certain arrangements for measuring the conductivity of liquids, the conductivity of a given solution of a substance or substances is compared to that of a similar solution of known concentration. Such arrangements are for example made use of in supervising the salinity of water in ships' boilers. Devices of this type should also be independent of ambient temperature which might effect exact measurement of a medium which has a non-negligible temperature coefficient.

Some of the principal objects of the present invention are to provide an electrode system which essentially fulfills these requirements and is simple, compact, durable, reliable and inexpensive, and lends itself easily for insertion into any installation where measurements or supervision of the above-indicated type are required.

In one aspect, the invention provides a cell which contains a standard specimen of the material in question, in such a manner that this specimen is permanently preserved, will not be chemically affected over a considerable time, and can be very easily associated with the detecting as well as the measuring components of installations of this type. In a further aspect, the electrode system according to the invention is so constructed that slight deviations from alignment of the electrodes will not adversely affect the exactitude of operation. In still another aspect, the invention is concerned with a self-contained probe unit, incorporating a standard electrode cell, which is not only inherently well protected but can be mounted for convenient inspection or exchange. As an additional feature, the invention provides for temperature compensation, if desired, by maintaining both the standard specimen and the supervised portion of the material in question at equal temperature.

Figure 1:
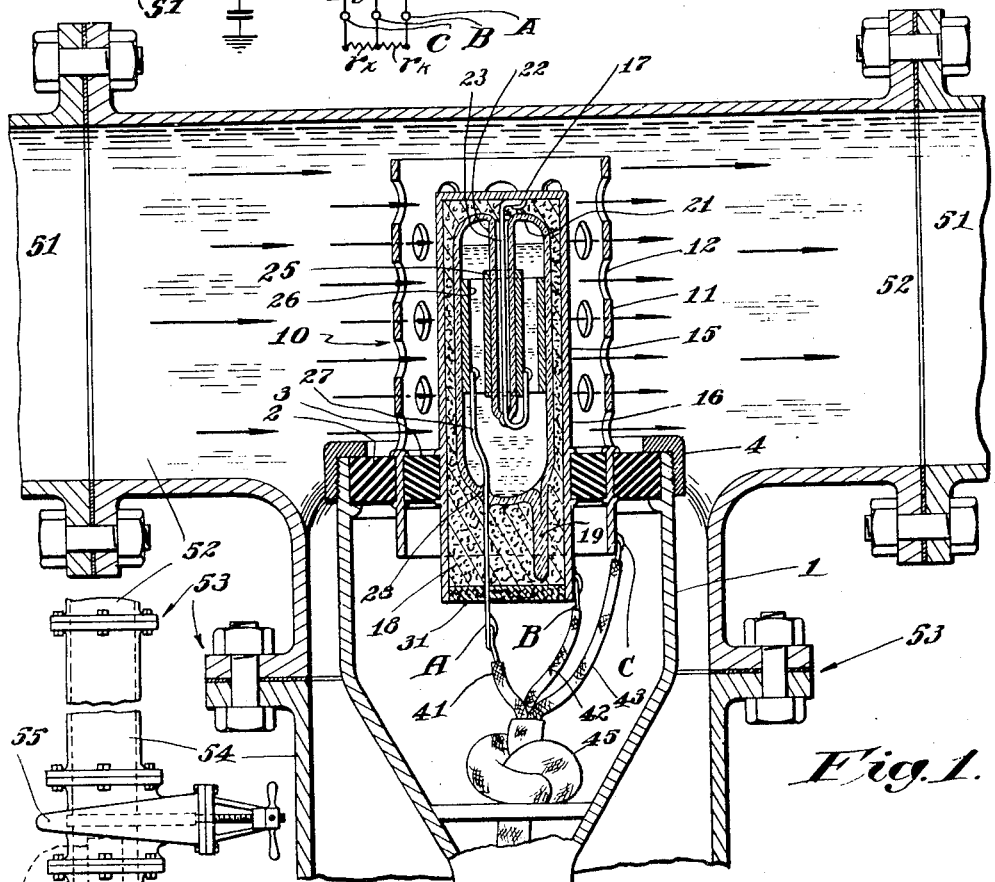
Figure 2:
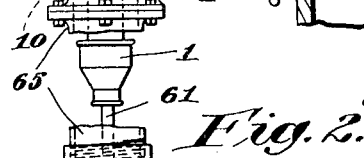

These and other objects, aspects and features will be more fully apparent from the following description of a practical embodiment illustrating the genus of the invention. The description refers to a drawing in which Fig. 1 is a characteristic section through an installation for supervising the conductivity of a liquid such as boiler feed water, incorporating an electrode system according to the invention;

Fig. 2 is a schematical elevation indicating a practical mounting for the electrode system shown in Fig. 1; and Fig. 3 is the diagram of an electrical circuit suitable for an installation according to Fig. 1.

As shown in Fig. 1, a holder 1 supports an electrode unit 10 by means of mounting rings 2 and 3, fastened to holder 1 with an open cap 4; rings 2 and 3 are made of suitable compressible insulating material, such as resilient rubber. The unit 10 comprises an outer guard or screen electrode member 11 in the form of a tube set into outer ring 2 and having perforations 12 which permit the flow therethrough of fluid to be tested. Within electrode 11 and ring 3 is mounted a container, cartridge, or shell electrode 15 made of suitable metal and having a tubular sidewall 16 and an end closure 17. Within shell 15 is embedded in suitable insulating filling material 18, retained within shell 15 by means of an insulating cover 31, a sealed vessel or cell 21 of glass, quartz or other material of low chemical activity.

Sealed into a stem 22 extending into cell 21 is a connector wire 23 the outer end of which is soldered or welded to the bottom 17 of shell 15 whereas its inner end is similarly fastened to a tubular inner electrode 25 surrounding stem 22. Close to the inside of the wall of vessel 21 and coaxial to electrode 25 is arranged a second tubular electrode 26 which is connected to a wire 27 which leads by means of a suitable seal 28 through vessel 21, and also through filler 18 and the cover 31 which closes shell 15. The electrodes 25, 26 may be suspended on wires 23, 27, respectively, or they may fit, and be supported by stem and cell wall, respectively. The electrodes as well as the lead wires are made of a metal or metal alloy of low chemical activity.

The vessel is filled, through stem 19 which is then sealed, with material of known electrical characteristics, providing a standard for measuring the corresponding characteristics of the material to be supervised. In the example herein described, the cell will be filled with feed water of known, standard concentration.

Soldered to wire 27, cartridge 15 and guard 11 are at A, B, C respectively, the wires 41, 42, 43 of a conductor cord 45 secured to holder 1 in any suitable and convenient way.

The holder 1 may be of any suitable form, and supported in any manner convenient for the purpose at hand. By way of example, the installation of an electrode system according to the invention, within a tube conducting liquid to be supervised, and permitting withdrawal of the electrode system for inspection and exchange is shown in Figs. 1 and 2 as follows:

Tubes 51 are part of a conduit system carrying the fluid to be supervised, for example boiler feed water. A branch piece 52 is at 53 flanged to a withdrawal tube 54 (Fig. 2) which leads to a gate valve 55 and an extension tube 65 which carries at its outer end a conventional stuffing box 57 screwed at 59 to tube 65 and sealing a tube 61 that is fastened to holder 1, and carries handles 62. Cord 45 may be confined within tube 61 from where it leads to the measuring circuit.

By way of example, the use of an electrode system according to the present invention in a measuring circuit will now be described with reference to Fig. 3.

The circuit shown in Fig. 3 may be supplied from a direct current line S1, S2 from which current of practically constant voltage is derived by suitable conventional means indicated by a gas-filled voltage regulator tube $Tv$ in series with limiting resistance $Rv$. It is evident that, with suitable rectifying means, an alternating current supply might be used.

Alternating current for the measuring circuit is derived from a conventional electronic oscillator O, preferably of a type which is essentially stable with frequency, connected to constant voltage supply S1, S3. The output circuit of the oscillator contains the primary $L4p$ of a transformer $L4$ whose secondary $L4s$ feeds into a detecting circuit with potentiometer resistor $Rd$, terminal wire S4 and tap N. The tap N of resistor $Rd$ is connected to the probe contact A. The primary $L5p$ of a transformer $L5$, which couples the detecting circuit to a measuring circuit, is connected on the one side to the second probe contact B and on the other side to terminal S4 and the third probe contact C.

The secondary $L5s$ of transformer $L5$ is on the one side connected to supply terminal S1, and on the other to cathode $k3$ of a rectifier tube $Tr$ whose anode $a3$ is coupled, by means of resistor $Rn$ to the grid $g4$ with condenser $Cm$, of a measuring amplifier tube $Tm$ with anode $a4$ and cathode $k4$. Proper relation between the potentials of grid $g4$ and cathode $k4$ is maintained by means of adjustable resistance $Rm$.

The anode $a4$ of meter tube $Tm$ is connected to lead S3 through a meter relay coil M, if desired in series with a meter $m$.

Meter relay coil M actuates a switch S3 which, with the current in the anode circuit of $Tm$ below a certain value, energizes a suitable signaling device D.

Between the probe terminals A and B is connected the standard liquid column between cell electrodes 25 and 26, and between terminals B and C the resistance to be measured, namely the feed water column flowing between shell electrode 15 and guard electrode 11. Cell electrode 25 and shell 15 are of course connected through wire 23.

This arrangement functions as follows:

The output energy of the oscillator applies a substantially constant voltage $E$, of substantially constant frequency, across points S4 and N of detecting resistor $Rd$, which voltage $E$ is applied to terminals A and C. The voltage $E$ and the voltage $e$ between terminals C and B follow the relation $e(r_x+r_k) = r_x E$, where $r_k$ is the known resistance of the standard solution in cell 21 (Fig. 2) and $r_x$ the unknown varying resistance of the fluid column in tube 52 between electrodes 11' and 15. Hence, $$e = \frac{r_x}{r_x+r_k} E$$

The standard solution with resistance $r_x$ is a solution of the same substance as is present in solution $r_k$ and the two solutions will therefore have substantially the same temperature coefficient of resistance. The expression $$\frac{r_x}{r_x+r_k}$$

is then independent of the temperature.

The voltage $e$ appears between terminals B and C, and hence across transformer $L5$ which impresses a voltage proportionate thereto on grid $g4$ of tube $Tm$, upon rectification by tube $Tr$.

Accordingly, the conductivity of tube $Tm$ will be proportionate to $e$ and therefore to $r_x$ by the expression $$e = \frac{r_x}{r_x+r_k} E$$

and coil M will respond and move switch $s3$ when resistance $r_x$ is below, and hence the concentration of the liquid in conduit 52 exceeds a predetermined value, this response being unaffected by the temperature of the liquid in cell 21. Milliammeter $m$, if properly calibrated, will directly indicate the concentration of the fluid passing through conduit 51, 52.

By adjusting magnet M for response at a selected value of $e$, the signaling device D will respond when the concentration exceeds that permissible value.

It will now be understood that the standard cell need not be connected between terminals A and B, but can be connected between B and C, with the solution of unknown conductivity connected between A and B, provided that a function between $E$ and $e$ is maintained which is similar to that explained above with reference to Fig. 3.

If it is desired to inspect or to exchange the electrode system, pipe 61 and holder 1 are withdrawn by pulling handle 62 outwardly through gland 57 until holder 1 and unit 10 have passed gate valve 55, as shown with dotted lines in Fig. 2. The gate valve is then closed, whereupon the gland can be unscrewed at 59 and holder 1 conveniently removed while the flow of liquid through tubes 51 and 52 is not affected. After reinserting the electrode system or a new holder, the stuffing box is screwed back onto tube 65 at 59, with holder 1 close to the stuffing box. After tightening the seal around tube 61, the gate valve 55 is opened and holder 1 with the electrode unit pushed into T-connector 52, into the position shown in Fig. 1.

It should be noted that the electrode cylinders 12, 15, 25 and 26 are so arranged that a slight displacement from coaxial position will not appreciably change the conductivity or capacitance therebetween. If tube 25 moves slightly out of normal position relatively to cylinder 26, the conductivity or capacitance of one side becomes greater, while that on the other side becomes less, and these changes tend to compensate each other thus diminishing possible errors in measurement due to changes in distance between the electrodes, occurring after the cell and the electrode unit as a whole have been calibrated.

It will now be evident that a device of the above-described type may be used in a number of different ways for measuring either the conductivity if conductive material is to be supervised, or the dielectric constant in the case of a nonconductive material, and that such material must not necessarily be a fluid but may for example be a powder. It will also be apparent that electrode systems as herein described may be used to measure the change of electrical characteristics of a substance with change in temperature and other physical conditions such as the change of conductivity of a fluid with change of illumination, or change of dielectric constant of a powder with mechanical disturbance.

It will further be apparent that standard cells as herein described can be used by themselves without temperature compensating arrangement. Supposing that it is desired to measure the conductivity of a fluid, the latter is introduced into the cell through stem 19, which is then sealed. Wires 23 and 27 are used as test terminals of a circuit suitable for measuring a current passing through the cell. If it is desired to measure the change of conductivity or dielectric constant with change of temperature, the cell may be heated or cooled to any desired degree for example by submerging it in suitable baths.

It should be understood that the present disclosure is for the purpose of illustration only and that this invention includes all modifications and equivalents which fall within the scope of the appended claims.

I claim:

1. An electrode system for measuring the conductivity of fluid of varying temperature, comprising in combination with a holder a probe unit insulated from and supported by said holder, said unit including an outer guard electrode adapted to pass said fluid, a container electrode located within said guard electrode and insulated therefrom, a sealed vessel of insulating material secured in said container electrode and being filled with material of known electrical characteristics, a first electrode located in said vessel and means for electrically connecting said electrode to said container electrode through a wall of said vessel, a second electrode located in said vessel and spaced from said first electrode, and an electrical conductor connected to said second electrode and leading through said vessel and outside of said container electrode.

2. An electrode system for immersion into material of characteristics to be tested or supervised, comprising an insulating sealed vessel filled with material of known electrical characteristics, a conductive container surrounding said vessel, an electrode immersed in the material of said vessel, an electrical conductor connecting said electrode through said vessel with said container, a second electrode located in said vessel and spaced from said first electrode, an insulated electrical conductor leading through said vessel and said container to said second electrode, and an outer electrode surrounding and insulated from said container.

3. An electrode system for immersion into material of characteristics to be tested or supervised, comprising an insulating tubular and hermetically sealed vessel filled with fluid material, a tubular metallic container coaxially surrounding said vessel, a tubular electrode immersed in the material of said vessel, an electrical conductor connecting said electrode through said vessel with said metallic container, a second tubular electrode located in said vessel and coaxially surrounding said first electrode and spaced therefrom, an insulated electrical conductor leading through said vessel and said container to said second electrode, and an outer tubular and perforated metallic electrode surrounding and insulated from said container.

E. CRAIG THOMSON.

REFERENCES CITED

The following references are of record in the file of this patent:

UNITED STATES PATENTS

| Number | Name | Date |
| --- | --- | --- |
| 1,138,761 | Kelley | May 11, 1915 |
| 1,450,023 | Edelman | Mar. 27, 1923 |
| 1,524,937 | Keeler | Feb. 3, 1925 |
| 2,122,363 | Christie | June 28, 1938 |
| 2,130,073 | De Lange et al. | Sept. 13, 1938 |
| 2,311,977 | Coleman | Feb. 23, 1943 |
| 2,330,394 | Stuart | Sept. 28, 1943 |
| 2,370,609 | Wilson et al. | Feb. 27, 1945 |

FOREIGN PATENTS

| Number | Country | Date |
| --- | --- | --- |
| 623,659 | Germany | Dec. 31, 1935 |